Figure 1:
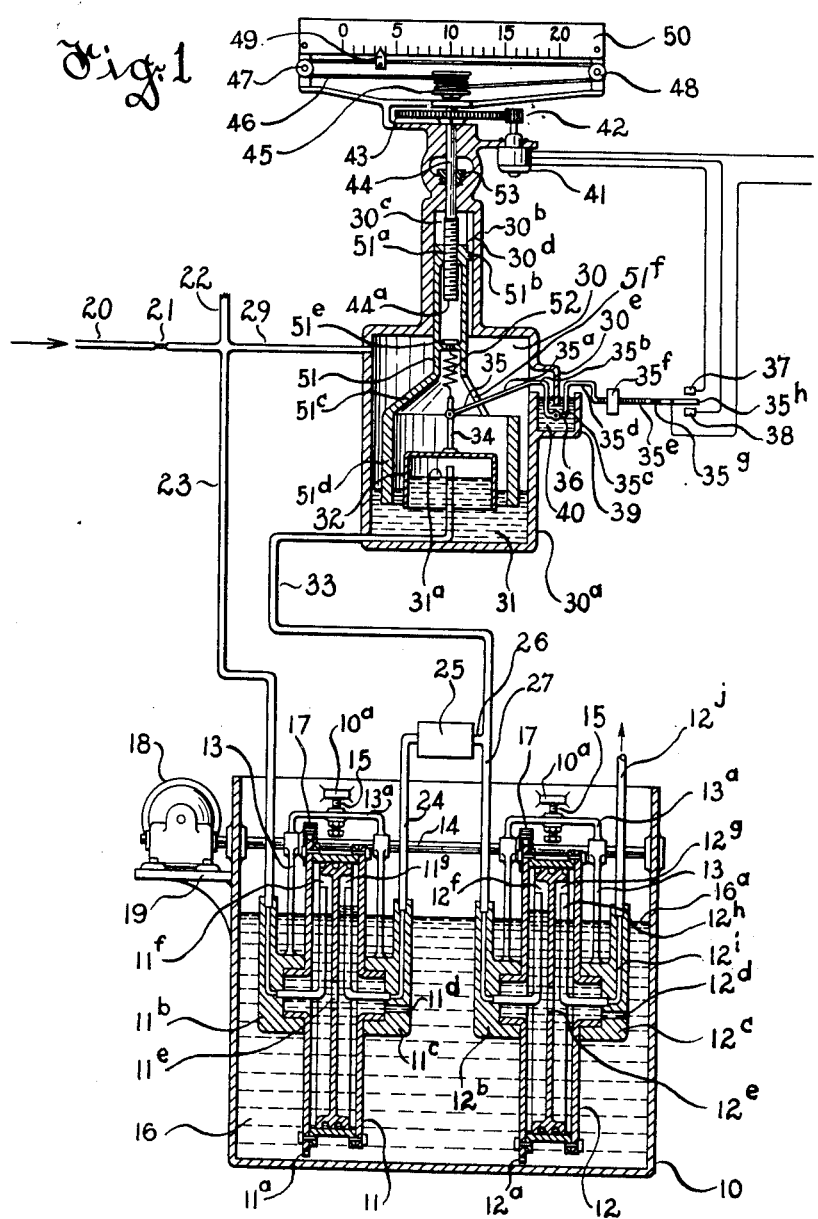

Dec. 9, 1952     E. X. SCHMIDT     2,620,666
FLUID PRESSURE SENSITIVE GAUGE

Original Filed Dec. 6, 1947     2 SHEETS—SHEET 2

Inventor
Edwin X. Schmidt
By Frank H. Hubbard
Attorney

Patented Dec. 9, 1952

2,620,666

UNITED STATES PATENT OFFICE 2,620,666

FLUID PRESSURE SENSITIVE GAUGE

Edwin X. Schmidt, Chenequa, Wis., assignor to Cutler-Hammer, Inc., Milwaukee, Wis., a corporation of Delaware Original application December 6, 1947, Serial No. 790,210. Divided and this application January 17, 1948, Serial No. 2,830

4 Claims. (Cl. 73—404)

This invention relates to improvements in liquid type sensitive gauges, and more particularly to gauges of the constant volume type.

This application is a division of my abandoned application, Serial No. 790,210, filed December 6, 1947, for Methods of and Apparatus for Continuously Analyzing Gases.

An object of the invention is to provide a novel form of gauge which is particularly adapted for use with gas analyzing apparatus of the character disclosed in my aforementioned abandoned application, Serial No. 790,210 (although not limited to such use), whereby the accuracy of the indication and/or recording of a value or values ascertained by a metering apparatus is substantially increased, and the time lag of the instrument as a whole is reduced to a minimum.

Another object is to provide an improved form of gauge of the constant volume type adapted for general use.

Other objects and advantages of the invention will hereinafter appear.

The accompanying drawings illustrate certain embodiments of the invention, which will now be described; it being understood that the embodiments illustrated are susceptible of modification in respect of certain structural details thereof without departing from the scope of the appended claims.

Figure 2:
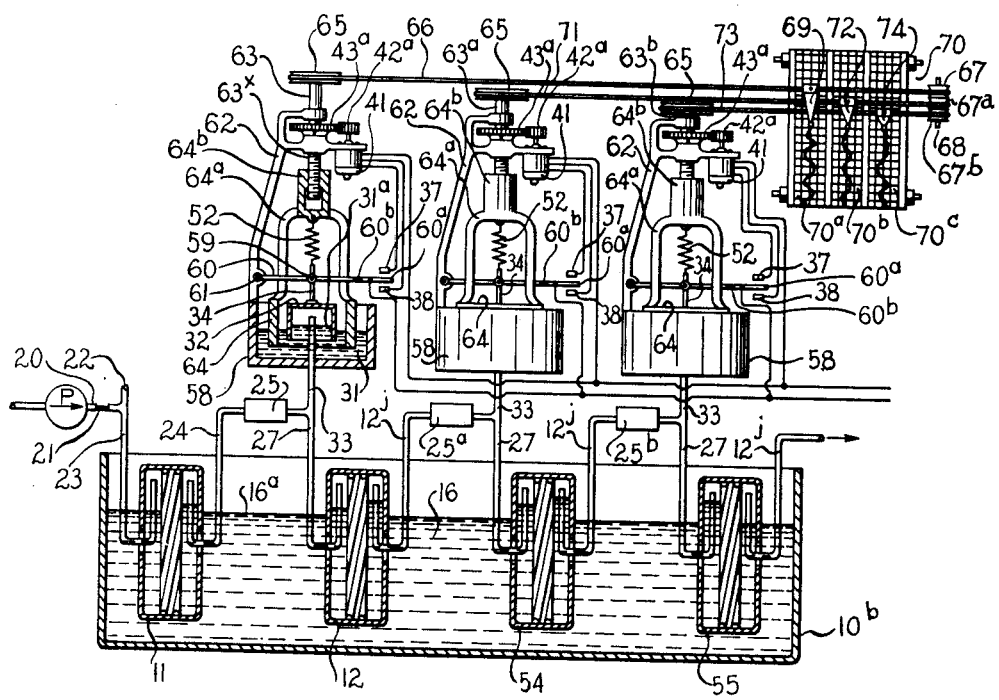

In the drawings,

Figure 1 illustrates schematically a gas analyzing apparatus having one form of my improved pressure gauge associated therewith to continuously indicate the volumetric proportionality of a constituent removed from a gas under test, and Fig. 2 similarly schematically illustrates a gas analyzing apparatus adapted to continuously remove a multiplicity of different constituents of a test gas, during passage of the latter in sequence between adjacent positive displacement liquid type meters or pumps of a multiple series; the structure of the gauges shown in this figure being slightly different from that shown in Fig. 1.

Referring first to Fig. 1, the numeral 10 designates a suitable tank or container within which a pair of meters or pumps 11 and 12 are adapted to be supported. Meters 11 and 12 are preferably of the character disclosed in my Patent No. 1,447,437, dated March 6, 1923. Said meters are rotatably supported within bearings arranged in normally fixed relation to tank 10, as by means of a pair of like yoke members 13, 13, which are in turn supported by a driving shaft 14 which is rotatable with respect thereto. Each yoke 13 is preferably provided at its upper end with a laterally offset portion 13a carrying a bolt 15 which is threadedly adjustable with respect thereto—the shanks of the two bolts 15, 15 being adapted for cooperation with lugs or projections 10a, 10a carried by tank 10 to control the height or position of the respective meters within said tank. By proper adjustment of one or the other or both of the bolts 15, 15 the normal capacities of the meters 11 and 12 may be equalized at a predetermined value for any given height of the body of liquid 16, preferably mercury, within tank 10. The method of effecting adjustment of the meters to provide normally equal capacities thereof is a known expedient, and inasmuch as such method forms no part of the present invention a detailed description thereof is deemed unnecessary.

Meters 11 and 12 are adapted to be simultaneously rotated at like rates, as by means of a pair of like gears 17, 17 which are keyed or otherwise rigidly secured to shaft 14—said gears respectively meshing with gears or gear teeth 11a, 12a, which are preferably formed integrally with one side wall portion of each of said meters. Shaft 14 is driven at any suitable speed by a motor 18, which is shown supported upon a bracket 19 attached to an outer side wall of the tank 10. The aforementioned normally fixed bearings for the respective meters are designated by the numerals 11b, 11c and 12b, 12c.

The flue gas, or other gas to be tested, is supplied (as by a pump, not shown) through conduit 20 at any suitable pressure, which is preferably greater than atmospheric pressure. Located within conduit 20 is a restriction, shown diagrammatically at 21. At the delivery end of barrier 21 there is provided an open ended branch pipe 22 which may communicate directly with atmosphere. The barrier 21 restricts the flow of gas to such a value that said gas is able to escape through pipe 22 without raising the pressure upon the delivery side of barrier 21 above atmospheric pressure, and the outward flow of gas through pipe 22 effectively prevents induction of air. By this means the gas is supplied through pipe 23 to the inlet end of meter 11 at atmospheric pressure.

It may be assumed that the meters 11 and 12 are each so initially adjusted, with respect to the level 16a of the body of mercury 16 within container 10, as to provide for delivery by each of two cubic inches of test gas, air, or other gaseous fluid, per minute. If the outlet of meter 11 were directly connected with the inlet of meter 12 it is obvious that the same quantity of test gas would be passed through and delivered by both meters per unit of time, and hence there would be a common level 16a of the mercury within tank 10 and within the inlet and outlet ends of each of the meters 11 and 12—it being noted that said meters are respectively provided with openings 11$^d$, 11$^e$, and 12$^d$, 12$^e$, whereby the body of mercury 16 is free to move from each meter to the other, and from the inlet to the outlet, and vice versa, of each meter.

As disclosed in Fig. 1, however, the test gas is adapted to pass from meter 11 by conduit 24 through an absorbing medium, represented diagrammatically by the numeral 25, and thence by conduits 26 and 27 to the inlet end of meter 12. If it be assumed that the test gas is flue gas, and if it is desired to ascertain the proportional quantity or value of carbon dioxide contained therein, the absorbing medium 25 therefor may consist of a dry material, such as soda lime. If it is desired to employ a medium of the liquid type for absorbing the carbon dioxide, or for absorbing carbon monoxide, or oxygen, or another constituent of the flue gas, I prefer to employ any well known means (not shown) for drying the gas sample prior to its passage through the aforementioned orifice 21.

If the volume of gas passing through meter 12 is less than that passing through meter 11 (due to reduction in volume of the gas sample by the action of the absorbing medium 25 in removing a constituent thereof), meter 12 will pull a vacuum on the absorption chamber 25, which will correspondingly raise the level of mercury 16 at the inlet end 12$^f$ of meter 12—thereby reducing, by a proportional amount, the capacity of meter 12. The level of mercury 16 at the inlet end 12$^f$ of meter 12 will continue to rise until the capacity of meter 12 equals the volumetric rate of delivery of gas thereto. By measuring the difference between the level of mercury 16 at the inlet end 11$^f$ of meter 11 and the level of mercury 16 at the inlet end 12$^f$ of meter 12, I am able to ascertain the difference in volumetric rates of delivery of meters 11 and 12.

In practice the initial surface areas of the mercury 16 in the inlets 11$^f$ and 12$^f$ and outlets 11$^g$ and 12$^g$ of the meters 11 and 12 are all equal to each other, and each of said surface areas is preferably only a small fraction of the total surface area of the entire body of mercury 16. Thus, each of said inlet and outlet surface areas may be equal to one per cent. (or one one-hundredth) of the total surface area of the body of mercury 16. Accordingly, the aforementioned difference in the liquid levels in inlets 11$^f$ and 12$^f$ of said meters can conveniently be indicated and/or recorded by means of a gauge which measures the difference in pressure between the inlets 11$^f$ and 12$^f$. This gauge may be calibrated to indicate directly the percentage value of the volume of gas absorbed in the absorption chamber 25.

With further reference to Fig. 1, it is to be understood that the gas sample is discharged from the outlet end 12$^g$ of meter 12 through conduits 12$^h$, 12$^i$ and 12$^j$ to atmosphere—either directly as indicated, or through the medium of a flue or smokestack (not shown) wherein substantially atmospheric pressure obtains.

The operation of the device shown in Fig. 1 is as follows: Assume that the instrument is initially operating without absorption (as, for instance, when air is being passed through both meters 11 and 12), and indicating zero per cent. absorption. If then the sample of flue gas from which the constituent (say, carbon dioxide) is to be absorbed is passed through conduit 23 to and through meter 11, and thence through absorber 25 and meter 12; and if the volumetric proportionality of said constituent is 10 per cent. of the total volume of the flue gas sample—the instantaneous rate of delivery to meter 12 would fall to 90 per cent. of the volumetric rate of flow through meter 11. With this decreased net delivery rate to the inlet chamber 12$^f$ of meter 12, the pressure in said inlet chamber 12$^f$ would decrease and the level of the mercury body 16 therein and in the outlet chamber 11$^g$ of meter 11 would rise, whereas the level of the mercury body 16 in the inlet chamber 11$^f$ of meter 11 would fall. The capacity of meter 12 would thereby be reduced—that of meter 11 would be increased slightly (because of the decrease in the mercury level in the inlet 11$^f$ of meter 11);—the pressure difference between the inlet 11$^f$ of meter 11 and the inlet 12$^f$ of meter 12 increasing. As this pressure difference, which may be taken as an indication of gas concentration (that is, as an indication of the percentage content of said constituent in the gas sample), approaches the value satisfying the equation for stable pressure, an indication is obtained which is directly related to the partial pressure of the gas constituent removed from the gas sample by the absorbing medium 25.

Thus with the meter 11 delivering two cubic inches of flue gas per minute, and with the combined displacement of gas by the rise in liquid level in the inlet of meter 12 and in the outlet of meter 11 of .006 cubic inch for each per cent of change in the indication of the value of the constituent to be removed; starting with a 10 per cent difference between indication and absorption, during the reduction of indication from 10 per cent to 5 per cent, average difference 7½ per cent, (.006) (5) ÷ (.075) (2) minutes, or 12 seconds would be required. Similarly, in again halving the difference between indication and absorption, an additional 12 seconds would be required, etc.

If it be assumed that it is desired to indicate the percentage value of the removed constituent within plus or minus one-fourth of one per cent (for example, CO$_2$—12 per cent, within 11¾ per cent and 12¼ per cent), and the concentration should change substantially instantaneously from 12 per cent to 11 per cent, this would require 24 seconds before the indication reaches 11¼ per cent. Similarly, for ascertaining smaller concentrations, for the same 8.3 per cent change in the amount of absorption, 24 seconds would be required before the indication reaches the new value within 2 per cent of the actual concentration. With a change in concentration of double this amount the time required to indicate within 2 per cent of the actual concentration would be increased by 12 seconds.

With power driven liquid displacement meters 11 and 12 of equal capacities connected in series, with the absorption chamber 25 following meter 11, as shown; with the pressure at the inlet end 11$^f$ of meter 11 equal to the pressure at the outlet end 12$^g$ of meter 12; and with no (or zero) absorption by absorber 25, the pressures in the inlet and outlet ends of meters 11 and 12 will all be equal to each other.

A change in the distribution of the mercury sealing liquid in the various parts of the meters 11 and 12 changes the volumetric displacement of said meters. The relative levels of the body of mercury 16 in the various parts of the meters 11 and 12 depend upon the relative pressures of the test gas at different points in its flow through said meters; and if the flow of the mercury body 16 from one point to another offers no pressure drops, said relative levels are directly related to the differences in said pressures. The delivery rates of meters 11 and 12 depend not only upon their volumetric displacements (which depend upon the mercury level at the inlet end of each), but also upon the respective inlet pressures in said meters.

It may be pointed out that any increase in fluid pressure in the outlet end 11ᵍ of meter 11 as compared with the fluid pressure at the inlet end 12ᶠ of meter 12 (such as would result from a pressure drop through the absorber 25) would increase the level of mercury in each of the remaining three chambers (11ᶠ, 12ᶠ and 12ᵍ) by an equal amount. If the surface area of mercury in the outlet end 11ᵍ of meter 11 is one per cent. of the total surface area the fall in level of mercury in the outlet end 11ᵍ of meter 11 would be ninety-nine per cent. of the total pressure drop through absorber 25 and the rise in level in the remaining three ends 11ᶠ, 12ᶠ and 12ᵍ of the meters would be one per cent. of the total pressure drop. Since the mercury level in meters 11 and 12 would rise to like amounts (at the respective ends 11ᶠ and 12ᶠ thereof) due to this pressure drop, the volumetric capacities of the meters would be decreased by substantially like amounts and the relative capacities of the two meters would be substantially unaffected by the pressure drop through the absorber 25.

Similarly, a difference in pressure between the inlet 11ᶠ of meter 11 and the outlet 12ᵍ of meter 12 would only slightly affect the level in the inlets 11ᶠ and 12ᶠ of the respective meters and in the outlet 11ᵍ of meter 11, and would only slightly affect the relative volumetric capacities of the two meters.

In Fig. 1, the conduit 29 communicates with a closed chamber 30. Chamber 30 contains a predetermined quantity 31 of mercury, upon which an inverted cup-shaped float member or prover bell 32 is adapted to rest. A conduit 33 extends from the outlet end of absorber 25 into chamber 30 and upwardly through the body of mercury 31 and opens to the interior of bell 32 at a point above any level to be attained by mercury 31 therewithin during operation of the device. Rigidly attached to the closed upper end of bell 32 is a rod or stud 34. A lever 35 has one end thereof pivotally connected with stud 34 intermediate the ends of the latter—said lever having an upwardly angled portion 35ᵃ, a substantially horizontal portion 35ᵇ, a downwardly extending substantially U-shaped portion 35ᶜ (which is pivotally supported by a pin 36),— a second substantially horizontal portion 35ᵈ, and a portion 35ᵉ with which an adjustable counterweight 35ᶠ has threaded engagement. Extending outwardly from portion 35ᵉ, and insulated therefrom as indicated at 35ᵍ, is a contactor 35ʰ. Contactor 35ʰ is movable upwardly into engagement with a stationary contact 37 upon a predetermined degree of downward movement of bell 32, or downwardly into engagement with a stationary contact 38 upon a predetermined degree of upward movement of said bell.

As shown, the pivot pin 36 is located within a pocket 39 formed on the outer surface of the wall 30ᵃ of chamber 30; said pocket containing a quantity of liquid 40, such as mercury or water; and a vane or partition 39ᵉ extending outwardly from wall 30ᵃ and then downwardly into pocket 39, below the level of liquid 40, whereby lever 35 is free to pivot upon pin 36, whereas the interior of chamber 30 is sealed from the exterior thereof. Inasmuch as the interior of chamber 30 is subjected to atmospheric pressure by the means aforedescribed, the sealing liquid 40 might, of course, be omitted. Such seal, however, positively insures subjection of the exterior of bell 32 to the pressure of test gas as supplied to the first meter 11 of the series. The contactor 35ʰ cooperates with contacts 37 and 38 to control the operation or inoperation of a split-field reversible motor 41—the latter, when operated, acting through gearing 42 and 43 to effect rotation of a shaft 44 in one direction or the other. Shaft 44 has attached thereto a spool 45 to which the opposite ends of a flexible cord or wire 46 are connected. Cord 46 passes around a pair of spaced pulleys or rollers 47 and 48, and has attached thereto at a predetermined point an indicating element 49 for cooperation with a suitable scale 50. Scale 50 is preferably calibrated as shown to afford indication of the percentage or proportional volume of a constituent of the test gas.

Shaft 44 is mounted for rotary movement within a hollow upward extension 30ᵇ of chamber 30; said shaft being restrained against substantial upward or downward displacement relatively to said extension. Shaft 44 is provided with a threaded lower end portion 44ᵃ which cooperates with a threaded opening in the upper end 51ᵃ of a tubular metal member 51 which is slidable within the recess 30ᶜ in extension 30ᵇ—one side wall of said recess having a groove 30ᵈ and end 51ᵃ having a lateral projection 51ᵇ cooperating therewith to prevent rotation of said member 51. The lower end of member 51 is flared at 51ᶜ and rigidly connected with a ring portion 51ᵈ which is adapted to be immersed to a variable degree within the body of mercury 31 in chamber 30. A spring 52 is interposed under a predetermined degree of initial tension between the upper end of stud 34 and a point 51ᵉ in the length of member 51. A packing nut or gland may be arranged to surround shaft 44, as shown more or less diagrammatically at 53. The flared portion 51ᶜ is cut away, as shown at 51ᶠ, to equalize the pressures within and outside of member 51 and to permit lever 35 to act therethrough.

Inasmuch as the upper surface of bell 32 is subjected to atmospheric pressure (by communication of chamber 30 with conduit 29), it is to be understood that initial balancing of the parts will be effected by subjecting the interior of bell 32 to atmospheric pressure. Such balancing may be effected by passing through pump 11, absorption chamber 25 and pump 12, air or a similar gas which is unaffected by the absorbing medium; or by passing the test gas through pumps 11 and 12 in series, while shunting the chamber 25 by any suitable means (not shown).

During such initial adjustment of the device of Fig. 1 (when no constituent is being removed from the gas or air during its passage seriatim through meters 11 and 12), the contactor 35ʰ will be automatically moved into engagement with contact 38 to effect operation of motor 41 in a direction to return indicator 49 toward the zero position on scale 50; whereupon contactor 35ʰ assumes the intermediate or balanced position thereof illustrated—or the same may be balanced by manual adjustment of the position of weight 35ᶠ. If necessary, the pointer or indicator 49 may be loosened and moved along cable 46 to the zero position of the scale 50, and then again clamped to said cable.

As will be apparent, the gauge illustrated in

Fig. 1 is of the constant volume type. The degree of tension upon spring 52 depends only upon the weight of the bell or float 32, plus the weight of that portion 31ᵃ of the mercury 31 inside of the bell which is above the level of said mercury outside of said bell. It is also very slightly affected by the weight of mercury 31 displaced by the side walls of bell 32. If the last mentioned effect is neglected, and if bell 32 is maintained in substantially the same position at all times, the top support (point 51ᵉ of member 51) will then assume a position which is directly related to the difference in pressure between the inside and outside of bell 32—regardless of the actual levels of the mercury inside and outside of said bell—the displacing ring portion 51ᵈ cooperating with the body of mercury 31 to provide for attainment of this result.

Let it be assumed that a decrease in the inlet pressure of meter 12 occurs. Such decrease in inlet pressure, by virtue of conduit 33, results in a rise in the level of mercury 31ᵃ in bell 32 and in a consequent decrease in the level of the mercury in chamber 30 outside of bell 32. If the displacer ring 51ᵈ were omitted, the result would be that the volume of the gas in bell 32 above the level of mercury 31ᵃ would decrease.

However, in the present gauge as the level of mercury 31ᵈ rises in the bell 32, an increase in the force exerted by bell 32 and the weight of mercury therein above the level of mercury outside the bell on lever 35 occurs, and the latter is caused to move in the counterclockwise direction, as viewed in Fig. 1, to engage its portion 35ʰ with contact 37. Motor 41 would consequently be energized to drive shaft 44 in a direction such that displacer member 51 would be raised relative to the bottom end of chamber 30. Such raising of displacer member 51 results in progressive decrease in the amount of mercury displaced by displacer ring 51ᵈ and accordingly the level of mercury in chamber 30 decreases. Such decrease in the level of mercury in chamber 30 occurs both inside and outside of bell 32, and consequently the counterclockwise force exerted by bell 32, and the weight of mercury therein above the level outside thereof, on lever 35 decreases. Ultimately such counterclockwise force rebalances with that exerted by spring 52 and lever 35 again reaches its balanced position shown in Fig. 1 wherein its portion 35ʰ disengages from contact 37. When such condition of rebalance of lever 35 occurs, if displacer ring is of proper size, the volume of gas (and the consequent pressure thereof) will be the same as that preceding the assumed decrease in pressure at the inlet of meter 12. It will be appreciated that the gauge will function in the reverse manner from that hereinbefore described upon a decrease in inlet pressure at meter 12.

If desired, displacer ring 51ᵈ could be selected of such size that the volume of gas inside bell 32 actually increases with a decrease in pressure of test gas and vice versa. With such a negative change of capacity inside of bell 32, the positive change in capacity of the inlet head 12ᶠ of meter 12 and outlet head for the same change in pressure may theoretically be neutralized. However, from the viewpoint of practicality it is desirable to slightly under-compensate for the sake of stability and by the use of a device like that shown in Fig. 1 I am enabled to appreciably reduce the time lag in responding to changes in the proportionality of the absorbed constituent of the test gas, the tendency of the device to hunt being considerably reduced by the under-compensation.

Although I have shown the element 49 as an indicator for cooperation with scale 50—it will be apparent to those skilled in the art that the same may have attached thereto a recording stylus or pen for cooperation with a power driven record chart (not shown) of any suitable form.

In Fig. 2 I have illustrated schematically a gas analyzing apparatus for ascertaining the instantaneous proportional or percentage value of three different constituents (such as carbon dioxide, carbon monoxide, and oxygen) of the test gas. Such apparatus involves use of a series of four meters 11, 12, 54 and 55, of like form and size, and a series of three gauges 64, of like form and size—the gauges shown in Fig. 2 being of more simple construction than that of Fig. 1, and the same being rigged to provide for automatic and simultaneous indication and recordation of the several values to be ascertained. Thus the tank 10ᵇ may be similar to but correspondingly larger than that shown in Fig. 1 and the meters 11, 12, 54 and 55 may be connected with a common driving motor (not shown), such as the motor 18 aforedescribed.

The test gas may be supplied by a pump P for flow through a conduit 20 and orifice or restriction 21, to conduit 23—whose upper end 22 is open to the atmosphere—whereby the test sample as supplied to the inlet end of meter 11 is at substantially atmospheric pressure. The outlet end of meter 11 is connected by conduit 24 with the absorbing chamber 25, wherein a constituent of the gas (say, carbon dioxide) is removed. The outlet end of absorbing chamber 25 is connected by one branch conduit 27 with the inlet end of meter 12, and by another branch conduit 33 with the inside of bell 32 above the highest point which the level 31ᵃ of the body of mercury 31 will attain within said bell. The body of mercury 31 is contained within a tank 58 which is open to the atmosphere, wherefore the exterior of bell 32 and the body of mercury 31 outside of said bell are subjected to atmospheric pressure.

The stud 34 extending upwardly from bell 32 is pivotally connected at 59 to a contactor lever 60, whose left-hand end is pivotally attached at 61 to a bracket 62 which is rigidly connected to tank 58. The contactor 60ᵃ is connected to the right-hand end of lever 60, and is insulated therefrom, as indicated at 60ᵇ; said contactor being adapted to cooperate with upper and lower stationary contacts 37 and 38, to effect operation of motor 41 in one direction or the other, as described in connection with Fig. 1. Motor 41 is connected through gears 42ᵃ and 43ᵃ with a shaft 63, whose threaded lower end 63ˣ cooperates with the correspondingly threaded portion 64ᵇ of an upward extension 64ᵃ of ring 64 to effect upward or downward displacement of the latter, with a consequent variation of the level of the body 31 of mercury exteriorly of bell 32, to effect return of bell 32 and the contactor 60ᵃ to the intermediate or neutral positions thereof illustrated. A coiled spring 52 is interposed under a predetermined degree of tension between the upper end of stud 34 and the aforementioned portion 64ᵇ—so that the tension of said spring is varied with the raising or lowering of displacement ring 64. Shaft 63 has non-rotatably attached to its upper end a grooved wheel or the like 65 to receive the left-hand end portion of an endless cord or cable 66, whose right-hand end portion is fitted into a groove of a spool 67 which is rotatably supported by a pin 68.

Cord 66 has attached thereto at a predetermined point an indicating and recording stylus 69, which is adapted to cooperate with the left-hand section 70ª of a chart 70 which is adapted for continuous movement at a constant rate by any suitable or well known means, such as a clockwork (not shown). The chart section 70 is preferably calibrated to afford instantaneous indication and simultaneous and continuous recordation of the proportional or percentage value of the carbon dioxide in the test gas.

After passage through the second meter 12 of the series, the flow of test gas (reduced in volume to a degree corresponding to the proportional value of the first mentioned constituent, carbon dioxide, which has been removed therefrom) passes through the second absorbing chamber 25ª, which is adapted to remove another constituent, such as carbon monoxide. The outlet end of chamber 25ª communicates through a branch 27 with the inlet end of the third meter 54 of the series, and through another branch conduit 33 with the interior of the bell or float of the second gauge 58 of the series. As shown at 63ª the rotatable shaft of said second gauge is relatively shorter than the aforementioned shaft 63, to provide clearance between the grooved wheel 65 attached to the former, and the aforementioned cable 66. A relatively shorter endless cable 71 extends between the last mentioned wheel 65 and a second spool 67ª—and said cable 71 has attached thereto at a suitable point an indicating and recording stylus 72 for cooperation with the intermediate section 70ᵇ of the record chart 70. Stylus 72 cooperates with the chart section 70ᵇ to continuously indicate and record the combined proportional or percentage value of the constituents removed in the two absorption chambers 25 and 25ª. If it is desired to know the proportional or percentage value of carbon monoxide removed in chamber 25ª, this may be readily calculated by merely subtracting the instantaneous value recorded upon chart section 70ª from the corresponding value recorded upon chart section 70ᵇ.

The further reduced volumetric flow of test gas when discharged from the third meter 54 is passed through the third absorbing chamber 25ᵇ to effect removal of another constituent, such as oxygen. The outlet end of chamber 25ᵇ communicates through a branch conduit 27 with the inlet end of the fourth meter 55, and through another branch conduit 33 with the interior of the bell or float of the third, or right-hand, gauge of the series. The shaft 63ᵇ of the last mentioned gauge is sufficiently short to provide clearance between the wheel 65 attached thereto and the cable 71. A relatively shorter endless cable 73 is interposed between the wheel attached to shaft 63ᵇ and a third spool 67ᵇ, said cable having attached thereto at a predetermined point an indicating and recording stylus 74 which cooperates with the right-hand section 70ᶜ of chart 70 to continuously indicate and record the combined instantaneous proportional or percentage values of the three constituents (carbon dioxide, carbon monoxide and oxygen) removed from the test gas. If it is desired to know the instantaneous proportional or percentage value of the oxygen in the test gas it is only necessary to subtract the value shown on chart section 70ᵇ from the value shown simultaneously on chart section 70ᶜ.

Although I have illustrated in Fig. 2 means for ascertaining and indicating and recording the proportional or percentage values with respect to three constituents of the test gas, it is to be understood that additional meters and gauges may be incorporated in the system, with a corresponding addition to the number of chart sections and parts to be associated therewith—whereby the proportional or percentage value of other constituents of the test gas may be ascertained and indicated and recorded.

I claim:

1. In a liquid pressure gauge of the type wherein the interior of a prover bell floating on a liquid is exposed to a fluid having a variable degree of pressure the value of which it is desired to ascertain, and wherein the level of the liquid within the bell varies in accordance with the pressure of said fluid and thereby also varies the volume of the fluid within said prover bell, means for maintaining said volume substantially constant regardless of the pressure of said fluid comprising, in combination, a displacement member partially immersed in said liquid and movable in a vertical direction to raise or lower the level of said liquid, spring tension means connected between said prover bell and said movable displacement member whereby upon an increase in the level of said liquid the tension of said spring means is decreased, and vice versa, and actuating means responsive to changes in the vertical position of said bell and connected to said movable displacement member for selectively raising or lowering said last mentioned member whereby the liquid level within said bell and consequently the volume of fluid within said bell are maintained substantially constant.

2. A gauge comprising, in combination, a container, a body of liquid partially filling said container, a prover bell floating upon said body of liquid, means for subjecting the exterior of said bell and the upper surface of said body of liquid to a predetermined substantially constant degree of pressure, means for subjecting the interior of said bell to a variable degree of pressure the value of which it is desired to ascertain, a displacement member partially immersed in said liquid and movable in opposite directions to increase or decrease the level of said body of liquid, actuating means responsive to changes in the vertical position of said bell and connected to said movable displacement member for selectively raising or lowering said liquid level in accordance with said changes in vertical position of said bell, a tension spring connected between said bell and said displacement member whereby upon an increase in the level of said body of liquid the tension of said spring is decreased, and vice versa, and means movable with and in a direction corresponding to the movement of said displacement member, said last mentioned means being adapted to continuously indicate the variable value of pressure within said bell.

3. A pressure gauge comprising, in combination, a container, a body of liquid partially filling said container, a prover bell floating upon said body of liquid and having its interior subject to a variable degree of pressure the value of which it is desired to ascertain, said body of liquid having its upper surface and said prover bell having its exterior surface exposed to atmospheric pressure, a displacement member partially immersed in said liquid and movable in opposite directions to raise or lower the level of said body of liquid, a tension spring connected between said movable displacement member and said bell whereby upon an increase in the level of said body of liquid the tension of said spring is decreased, and vice versa, actuating means responsive to changes in the vertical position of said bell and connected to said displacement member for selectively moving said last mentioned member to raise or lower the level of said body of liquid in accordance with changes in said vertical position whereby the level of the liquid within said bell remains substantially constant with respect to said bell, and means movable with and in a direction corresponding to the movement of said displacement member, said last mentioned means being adapted to continuously indicate the variable value of pressure within said bell.

4. In a pressure gauge, in combination, a container, a body of mercury partially filling said container, a prover bell floating upon said body of mercury, means for subjecting the exterior of said bell and the upper surface of said body of mercury to atmospheric pressure, means for subjecting the interior of said bell to a variable degree of pressure the value of which it is desired to ascertain, a displacement member partially immersed in said mercury and movable in opposite directions to increase or decrease the level of said body of mercury, a tension spring connected between said movable member and said bell whereby upon an increase in the level of said body of mercury the tension of said spring is decreased, and vice versa, a reversible electric motor operatively connected to said displacement member, control means for said motor responsive to changes in the vertical position of said bell whereby said motor may be selectively actuated to increase or decrease the level of said body of mercury for effecting the automatic return of said bell to a predetermined position, and means movable with and in a direction corresponding to the movement of said displacement member, said last mentioned means being adapted to continuously indicate the variable value of pressure within said bell.

EDWIN X. SCHMIDT.

REFERENCES CITED

The following references are of record in the file of this patent:

UNITED STATES PATENTS

| Number | Name | Date |
| --- | --- | --- |
| 1,174,241 | Earl | Mar. 7, 1916 |
| 1,682,602 | Dawley | Aug. 28, 1928 |
| 1,700,852 | Packard | Feb. 5, 1929 |
| 1,877,810 | Chamberlain | Sept. 20, 1932 |
| 2,363,174 | Green et al. | Nov. 21, 1944 |

FOREIGN PATENTS

| Number | Country | Date |
| --- | --- | --- |
| 564,871 | Germany | Nov. 24, 1932 |